United States Patent
Nguyen Kim et al.

(10) Patent No.: US 9,702,722 B2
(45) Date of Patent: *Jul. 11, 2017

(54) INTERACTIVE 3D NAVIGATION SYSTEM WITH 3D HELICOPTER VIEW AT DESTINATION

(71) Applicants: VOLKSWAGEN AG, Wolfsburg (DE); AUDI AG, Ingolstadt (DE)

(72) Inventors: Julia Nguyen Kim, Belmont, CA (US); Gerardo Alberto Rossano, Foster City, CA (US)

(73) Assignees: VOLKSWAGEN AG (DE); AUDI AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,854

(22) Filed: Sep. 26, 2015

(65) Prior Publication Data

US 2017/0089716 A1    Mar. 30, 2017

(51) Int. Cl.
G01C 21/00 (2006.01)
G01C 21/36 (2006.01)
G06F 17/30 (2006.01)
G06T 17/05 (2011.01)

(52) U.S. Cl.
CPC ..... *G01C 21/3638* (2013.01); *G01C 21/3647* (2013.01); *G06F 17/30241* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 8,359,157 B2 | 1/2013 | Figueroa | |
| 9,135,751 B2* | 9/2015 | Moore | G01C 21/3638 |
| 9,367,959 B2* | 6/2016 | Forstall | G01C 21/3638 |
| 9,417,087 B1* | 8/2016 | Nguyen Kim | G01C 21/367 |
| 2004/0218910 A1* | 11/2004 | Chang | G01C 21/3647 |
| | | | 386/241 |
| 2010/0250120 A1 | 9/2010 | Waupotitsch et al. | |
| 2016/0153789 A1* | 6/2016 | Gallar | G01C 21/34 |
| | | | 701/408 |

FOREIGN PATENT DOCUMENTS

| | | | | |
|---|---|---|---|---|
| DE | 102009034373 A1 * | 3/2010 | | G01C 21/3676 |
| EP | 2541201 A2 | 1/2013 | | |
| WO | 2011154050 A1 | 12/2011 | | |

* cited by examiner

*Primary Examiner* — Thomas G Black
*Assistant Examiner* — Demetra Smith-Stewart
(74) *Attorney, Agent, or Firm* — Barnes & Thornburg LLP

(57) ABSTRACT

An interactive vehicle navigation system provides not only navigation instructions to arrive at a destination but also a three-dimensional (3D) animated preview that provides a realistic view of a specified destination, including three-dimensional imagery of recognizable landmarks in the surroundings at the destination. The point of view from which the 3D animated preview is generated is selected as to provide a vantage of the locale that avoids obstructions to the user's view, such as from a point of view that is higher than street level.

20 Claims, 14 Drawing Sheets

INTERACTIVE 3D NAVIGATION SYSTEM WITH 3D HELICOPTER VIEW AT DESTINATION

BACKGROUND

The present disclosure relates to systems, components, and methodologies for vehicle navigation systems. In particular, the present disclosure relates to systems, components, and methodologies that provide a user with navigational instructions as well as the ability to provide an elevated view of surroundings at a destination.

SUMMARY

According to the present disclosure, systems, components, and methodologies are provided for providing navigational instructions to a user.

In illustrative embodiments, a vehicle navigation system provides route guidance to a user that includes instructions the user should follow at turns along a route. The three-dimensional (3D) animated preview provides a realistic view of a specified destination, including three-dimensional imagery of recognizable landmarks in the surroundings at the destination.

In accordance with embodiments, the point of view from which the 3D animated preview is generated is selected as to provide a vantage of the locale that avoids obstructions to the user's view, such as from a point of view that is higher than street level. The realistic, 3D animated previews make it easier for a user to understand the nature of the surroundings at the destination conveyed by the vehicle navigation system.

In illustrative embodiments, the navigation system includes user controls that enable a user to trigger display of the 3D animated previews, such steering wheel buttons, touch screen, voice control functionality, or other forms of user controls. The user controls enable a user to view the 3D animated previews at desired times, such as when it is convenient or safe to view the 3D animated previews. This prevents the user from being interrupted with navigational instructions when the user is not ready for them, such as when the user is focused on driving. The user controls enable a user to iterate through 3D animated previews along a route or to select a specific turn to preview. The navigation system may block display of 3D animated previews when the vehicle is moving due to safety considerations, and allow display of the 3D animated previews when the vehicle is stopped.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Disclosed embodiments may be implemented in conjunction with a navigation system that provides route guidance to a user that includes instructions the user should follow at turns along a route. The navigation system may, optionally, preview upcoming turns for the user by providing a three-dimensional ("3D"), animated rendering of how the locale of the turns will appear as the instructions for the turns are followed. The 3D animated preview may provide a realistic view of the locale, including three-dimensional imagery of recognizable landmarks in the locale. The point of view from which the 3D animated preview is generated may be selected as to provide a vantage of the locale that avoids obstructions to the user's view, such as from a point of view that is higher than street level. In this way, such a navigation system provides realistic, 3D animated previews make it easier for a user to understand the nature of the instructions being conveyed by the vehicle navigation system. As such, the interactive 3D navigation system may be implemented in a manner similar to that disclosed in U.S. patent application Ser. No. 14/616,133, entitled "INTERACTIVE 3D NAVIGATION SYSTEM," filed Feb. 6, 2015, which is incorporated by reference in its entirety.

Figure 1:
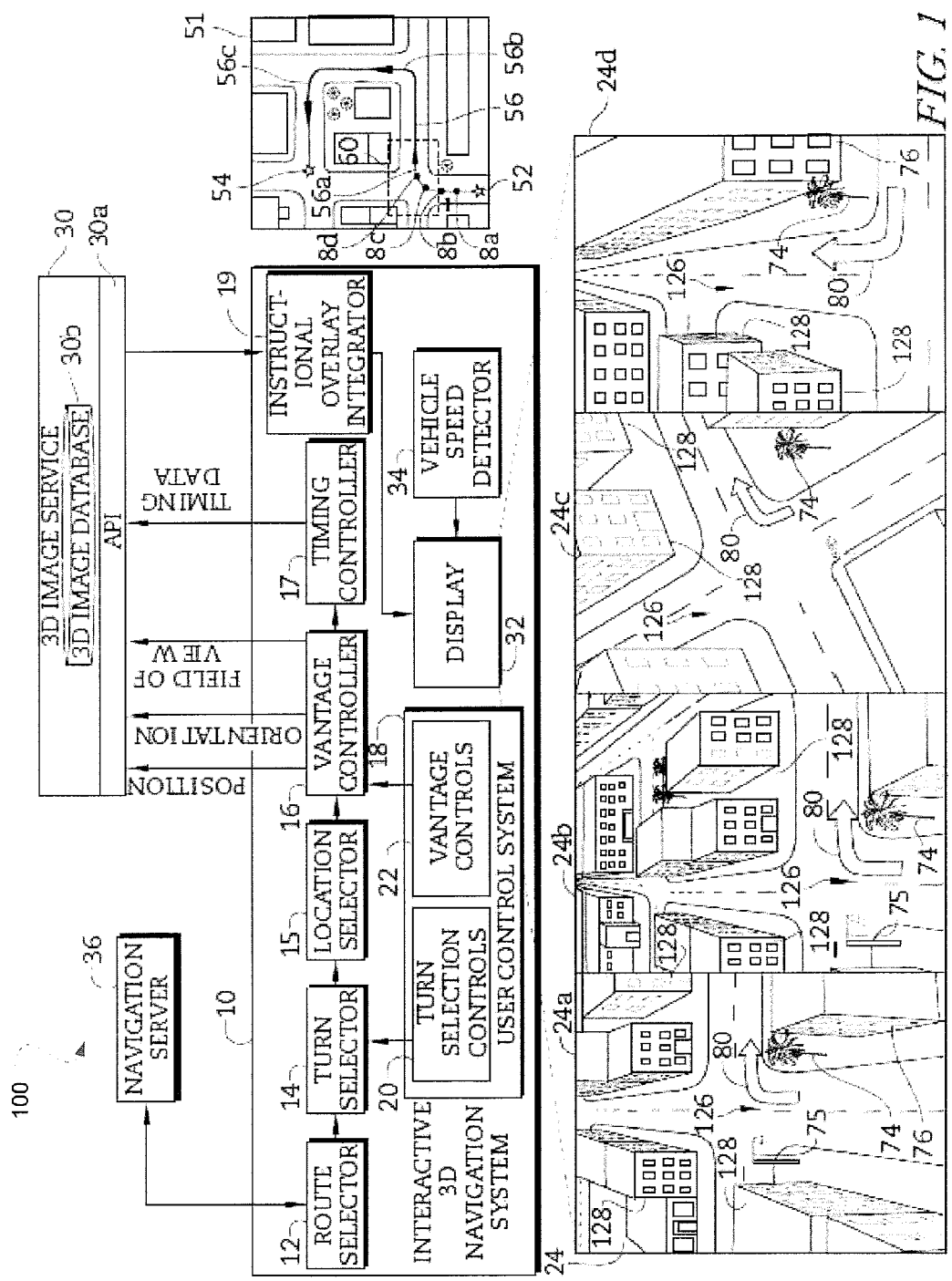
FIG. 1 is a diagrammatic view of an interactive 3D navigation system in accordance with the present disclosure showing that the interactive 3D navigation system communicates with a navigation server to receive route guidance, and may include a route selector for selecting a route between an origin and a destination, a vantage controller for computing a vantage for a preview, a timing controller for computing timing information that governs the animation speed of the preview, an instructional overlay integrator for retrieving a 3D animated preview and overlaying instructions on the animated preview, a display for rendering the 3D animated preview, a user control system that enables a user to interact with the interactive 3D navigation system, a vehicle speed detector for determining and communicating vehicle speeds to the interactive 3D navigation system, and a 3D image service from which the interactive 3D navigation system may retrieve 3D image data.

As explained in that application, an interactive 3D navigation system 10 may provide route guidance instructions to a user and previews upcoming turns for the user through 3D, animated renderings of how the locale of the turns will appear as the instructions for the turns are followed. FIG. 1 is a diagrammatic view of interactive navigation system 100 which includes on-vehicle, Interactive 3D navigation system components 10 as well as off-vehicle components including, e.g., a navigation server 36 and 3D Image Service and database(s) 30.

The on-vehicle, interactive 3D navigation system components 10 may include certain components for selecting the turn to be previewed, including a route selector 12 that enables a user to select a route to follow from an origin to a destination and a turn selector 14 that enables a user to select a turn along the selected route that the user wishes to preview. The on-vehicle, interactive 3D navigation system components 10 may also include means for selecting locations, such as a location selector 15 that selects locations 8a-8d along the turn that will be part of the preview, and means for selecting vantages, such as a vantage controller 16, that selects a vantage for each of the locations that promotes clear viewing of the locale of the turn. A user may select a desired turn to preview and may adjust the vantage through user control system 18. Once a route, turn, and vantage have been selected, the on-vehicle, interactive 3D navigation system components 10 may receive a 3D animated preview 24 of the selected turn.

In accordance with navigation, the 3D animated preview 24 may be retrieved from a cloud-based, 3D image service 30 using a network connection. Instructional overlay integrator 19 may add instructional overlays, such as instructional arrow 80, to 3D animated preview 24. A display 32 may then render 3D animated preview 24.

FIG. 1 illustrates 3D animated preview 24 by way of four exemplary image frames 24a-d that are part of 3D animated preview 24, but it should be understood that 3D animated preview 24 may be rendered with a sufficient number of frames and frame rate as to simulate continuous, live motion. 3D animated preview 24 simulates how the locale of the selected turn will appear as instructions for the selected turn are followed.

Prior to displaying 3D animated preview 24, display 32 may communicate with vehicle speed detector 34 to determine whether the user's vehicle is stopped or in motion. If the vehicle is in motion, the on-vehicle, Interactive 3D navigation system components 10 may determine it is unsafe to display 3D animated preview 24, and display 32 may instead show a still image of the selected turn, such as a frame 24a in isolation.

In more detail with reference to FIG. 1, route selector 12 may enable a user to choose an origin 52 and a destination 54 for which the user seeks route guidance. Route selector 12 may communicate origin 52 and destination 54 to navigation server 36, which computes a suitable route between origin 52 and destination 54, as is generally known for conventional navigation systems. Navigation server 36 may communicate the suitable routes to the user via display 32. Map view 51 depicts an illustrative route 56 for which the on-vehicle, Interactive 3D navigation system components 10 may generate previews, as will be explained below.

Route 56 may include a plurality of turns 56a-c and instructions that the user should follow at each of the turns 56a-c. For example, route 56 includes instructions that the user should turn right at turn 56a. Turn selector 14 selects one of turns 56a-c to preview for the user. Turn selector 14 may select one of turns 56a-c automatically or based on user input. When selecting one of turns 56a-c automatically, turn selector 14 may begin with the first turn 56a of route 56 and iterate through each of the turns 56a-c in chronological sequence. Alternatively, turn selector 14 may track the location of the user's vehicle (e.g., using a GPS module (not shown)) and determine which of the turns 56a-c the user will next encounter.

Figure 2:
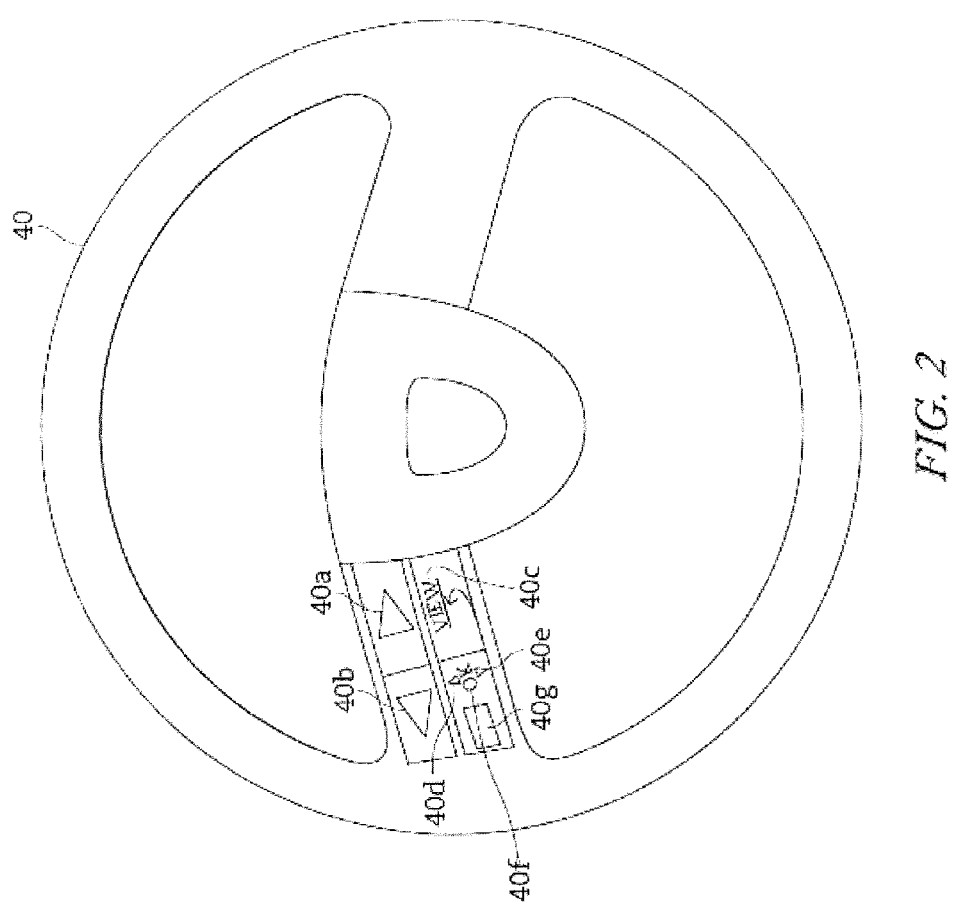
FIG. 2 is a front perspective view of a steering wheel with user control buttons in accordance with the present disclosure that enable a user to select turns or select vantages for turns that are previewed through 3D animated previews.

As noted, turn selector 14 may also select one of turns 56a-c through user input. User control system 18 may include turn selection controls 20 that enable a user to select one of turns 56a-c to preview. Turn selection controls 20 may include steering wheel buttons 40a-c located on a steering wheel 40, shown in FIG. 2. Use of steering wheel buttons 40a-c may promote vehicle safety and driver convenience because steering wheel buttons 40a-c enable a driver to make turn selections without having to move his or her hands from steering wheel 40. A driver may determine when he or she would like to view a 3D animated preview of a turn of interest, and use steering wheel buttons 40a-c to select and preview the turn of interest. Steering wheel button 40a may enable a user to iterate to a next one of turns 56a-c along route 56, steering wheel button 40b may enable a user to iterate to a previous one of turns 56a-c along route 56, and steering wheel button 40c may allow a user to finalize a selection of a particular one of turns 56a-c for previewing.

Other types of turn selection controls 20 may include voice recognition, such that the on-vehicle, Interactive 3D navigation system components 10 are responsive to voice commands from a user. By way of example, voice commands may instruct interactive 3D navigation system 10 to iterate to a next or a previous turn, to jump to a particular turn of interest, or to display a 3D animated preview of a selected turn. Other types of turn selection controls 20 may include touch-sensitive/haptic controls on steering wheel 40 or on display 32.

Returning to FIG. 1, in response to turn selector 14 selecting a turn 56a-c, location selector 15 selects locations along turn 56a-c that a vehicle is likely to traverse, and which should be included in 3D animated preview 24. In this example, location selector 15 selects four locations 8a-8d along turn 56a. In illustrative embodiments, location selector 15 selects fewer locations for ordinary turns, such as conventional right-hand or left-hand turns, and more locations for more complex maneuvers. By selecting more locations for complex maneuvers, 3D animated preview 24 is more likely to align with the actual path the vehicle takes as it traverses turns 56*a-c*.

In this illustrative example, location selector 15 selects a location 8*a* where a vehicle begins a maneuver, one or more locations 8*b*-8*c* that a vehicle may occupy while performing the maneuver, and a location 8d where a vehicle completes the maneuver. Locations 8*a*-8*d* guide 3D image service 30 in providing an appropriate animation, as will be explained below.

For each location selected by location selector 15, vantage controller 16 may select a vantage to be used for 3D animated preview 24. Vantage controller selects a point of view for 3D animated preview 24 that promotes clear viewing of locale 60 for selected turn 56*a*. A vantage may include a position, an orientation, and a field of view. A position may include latitude, longitude, and elevation of a point of view. An orientation may include an angular orientation (e.g., pitch, roll, and yaw) of a point of view. A field of view may specify lateral and vertical angular ranges for a field of vision to be displayed. As with turn selector 14, vantage controller 16 may operate automatically or manually based on user input.

Figure 3:
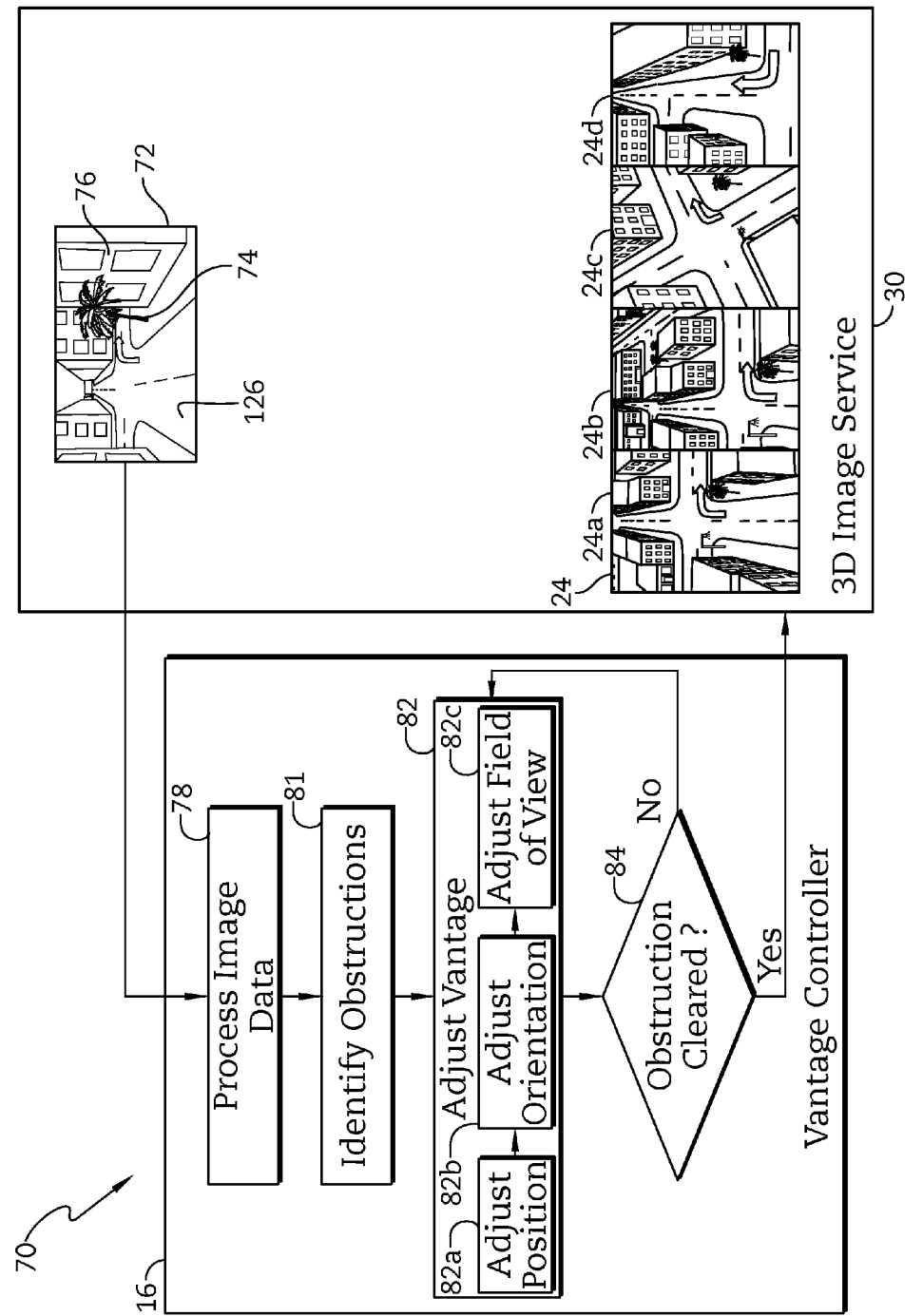
FIG. 3 is a diagrammatic view of a vantage selection process of the interactive 3D navigation system in accordance with the present disclosure showing that the vantage selection process includes the operations of processing image data, identifying obstructions, adjusting a vantage, including a position, orientation, and field of view, and determining if the obstruction is cleared.

FIG. 3 illustrates an automatic vantage selection process 70 wherein a vantage controller 16 may receive one or more frames 72 of 3D image data of locale 60 of turn 56*a*. As shown in FIG. 3, the vantage of frame 72 prevents clear viewing of locale 60 of turn 56*a* due to obstructions, including a tree 74 and a building 76. Vantage selection process 70 may include a processing operation 78 that performs image processing on frame 72, such as to adjust and enhance image properties (e.g., brightness, contrast, edge enhancement, noise suppression, etc.). Vantage selection process 70 may proceed to an identifying operation 81 that identifies obstructions within frame 72. Identifying operation 81 may implement any suitable object detection, recognition, and classification methodology to identify a roadway 126 and obstructions, such as tree 74 and building 76, that obscure roadway 126.

Vantage selection process 70 may then proceed to an adjusting operation 82 that adjusts the vantage as to avoid obstructions 74, 76. Adjusting operation 82 may include an adjusting operation 82*a* that adjusts a position, an adjusting operation 82*b* that adjusts an orientation, and adjusting operation 82*c* that adjusts a field of view. Vantage selection process 70 may then proceed to a determining operation 84 that determines whether obstructions 74, 76 have been cleared from the view of roadway 126. If not, vantage selection process 70 returns to adjusting operation 82, and iteratively adjusts the vantage until obstructions 74, 76 have been cleared. In response to a determination that obstructions have been cleared, vantage selection process 70 concludes.

Frames 24*a-d* illustrate an exemplary result of vantage selection process 70. In this example, the position was adjusted to increase elevation, the orientation was adjusted to point downwards towards roadway 126, and the field of view was increased to provide a larger area for viewing. This provides a point of view that avoids obstructions 74, 76. In other examples, it may be advantageous to change position, orientation, or field of view in other respects. For example, if there is an overhead bridge on a roadway, it may be advantageous to lower the position such that a user can see below the bridge.

In addition or alternatively, vantage controller 16 may enable a user to manually adjust the vantage based on user input. User control system 18 may include vantage controls 22, such as steering wheel buttons 40*a-g*, shown in FIG. 2. For example, steering wheel buttons 40*a*-40*b* may be used to adjust a latitude of a position and steering wheel buttons 40*d*-40*e* may be used to adjust a longitude of a position. Steering wheel buttons 40*d*-40*e* may also be used to adjust an elevation of a position higher or lower. Steering wheel buttons 40*a*-40*b* may be used to adjust a yaw of an orientation, steering wheel buttons 40*d*-40*e* may be used to adjust a pitch of an orientation, and other steering wheel buttons (not shown) may be used to adjust a roll of an orientation. Steering wheel buttons 40*a*-40*b* may be used to increase a horizontal angular view, and steering wheel buttons 40*d-e* may be used to increase a vertical angular view. Steering wheel button 40*f* may be used to finalize selections. Spin wheel 40*g* is an alternative form of vantage angle controls 22 and may be spun to modify the vantages. As with turn selection controls 20, vantage controls 22 may be implemented through other forms of user input, including voice control or touch/haptic control.

Returning to FIG. 1, in addition to vantage controller 16 computing vantages, The on-vehicle, Interactive, 3D navigation system components 10 include means for computing timing information, such as timing controller 17 that computes timing data to guide 3D image service 30 in creation of animations. So that 3D animated preview 24 can be rendered at a realistic speed representative of how long it would take a vehicle to navigate turn 56*a*, timing controller 17 computes timing data used to determine the relative speed of different portions of 3D animated preview 24. For locations 8*a*-8*d* that are spaced closely together, 3D animated preview 24 may proceed rapidly through image frames 24*a*-24*d*, simulating the relatively short period of time it would take a vehicle to traverse closely-spaced locations. For locations 8*a*-8*d* that are spaced far apart, 3D animated preview 24 may proceed slowly through image frames 24*a*-24*d*, simulating the relatively long period of time it would take a vehicle to traverse farther-spaced locations. Timing controller 17 computes an amount of time it would take a vehicle to navigate through locations 8*a*-8*d* based on distances between locations 8*a-d*.

The on-vehicle, Interactive 3D navigation system components 10 may then query 3D image service 30 for 3D animated preview 24. The query may include position, orientation, and field of view information computed by vantage controller 16, and timing data computed by timing controller 17. The on-vehicle, Interactive, 3D navigation system components 10 may query 3D image service 30 through an API 30*a*, which in turn may query and retrieve appropriate frames of image data from 3D image database 30*b*. Image data stored in 3D image database 30*b* may include, for example, photographic images, satellite images, or other forms of imagery. The query may include criteria for the desired frames of image data, including the geographic location of turn 56*a*, locations 8*a-c* selected by location selector 15, and the vantage computed by vantage controller 16. 3D image service 30 may retrieve the appropriate frames of image data and, based on timing data computed by timing controller 17, arrange the frames of image data into a 3D animated preview 24. In an exemplary implementation, 3D image service 30 may be provided, for example, by GOGGLE® EARTH®, from Google Inc. of Mountain View, Calif., with API 30*a* being a GOGGLE® EARTH® API.

The on-vehicle, Interactive, 3D navigation system components 10 retrieve 3D animated preview 24 from 3D image service 30. Instructional overlay integrator 19 integrates instructional overlays, such as instructional arrow 80, onto 3D animated preview 24. Instructional overlays may also include instructional text or other types of instructional symbols, such as lines or shapes directing a driver's attention to certain portions of 3D animated preview 24. 3D animated preview 24 includes 3D, realistic imagery of locale 60 of turn 56a, including buildings 76, 128, trees 74, lightposts 75, and other landmarks that may assist a user in recognizing locale 60 when the user actually arrives at locale 60. Use of 3D animated preview 24 in conjunction with instructional arrow 80 makes it easier for a user to recognize locale 60 and understand what instructions the user should follow at locale 60 in comparison to flat map depictions or other, more simplified map representations (e.g., wire-frames).

Display 32 may communicate with vehicle speed detector 34, which may obtain and communicate vehicle speed information to display 32 for safety or convenience considerations. Where a vehicle is in motion, it may be unsafe or distracting to display 3D animated preview 24 because the vehicle driver may be focused on driving and may not want to be interrupted by 3D animated preview 24. In such situations, it may be preferable to display a still image, such as an isolated frame 24a, of locale 60.

Figure 4:
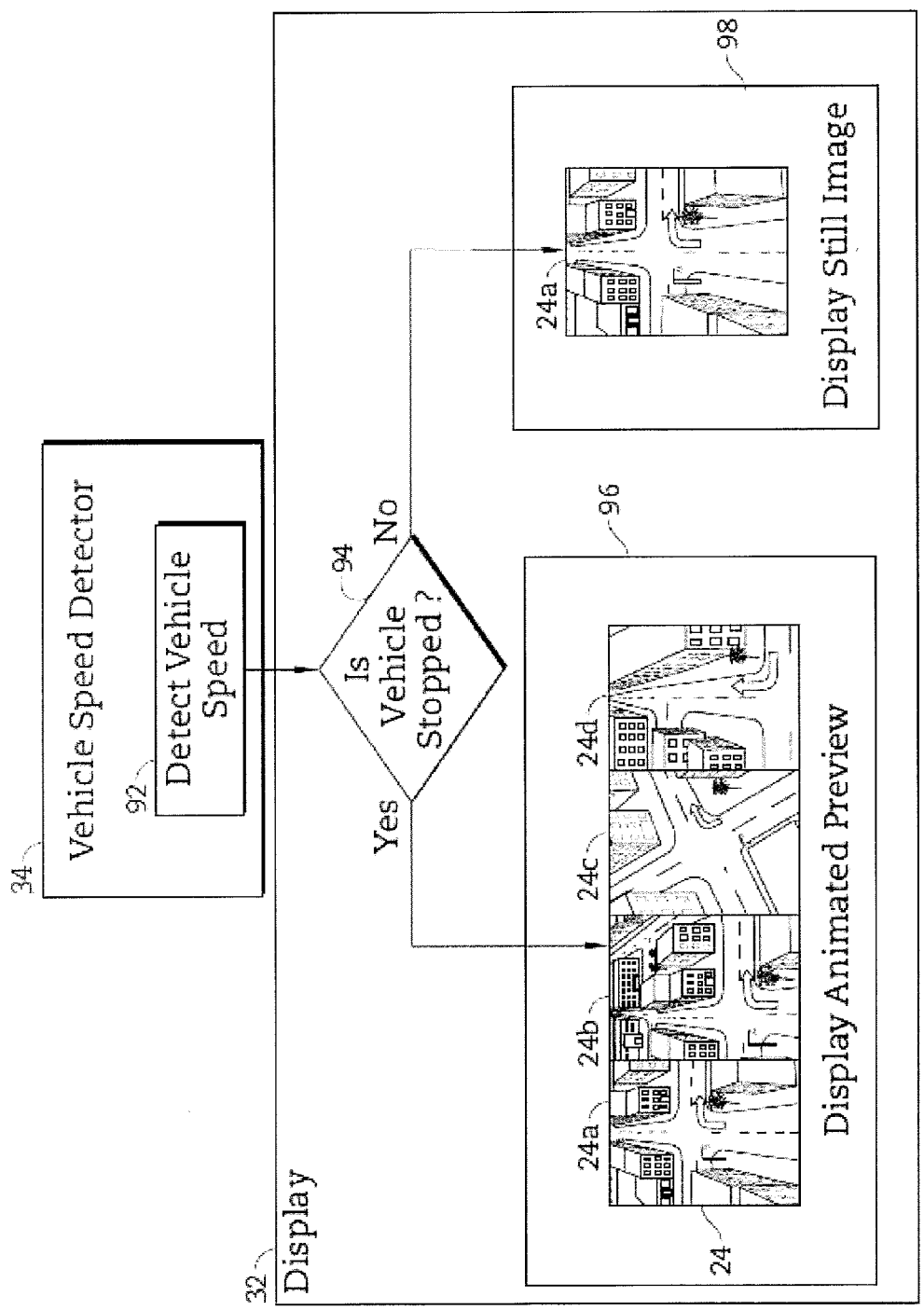
FIG. 4 is a diagrammatic view of a vehicle speed detection process of the interactive 3D navigation system in accordance with the present disclosure showing that the vehicle speed detection process includes the operations of detecting vehicle speed, determining whether the vehicle is stopped, displaying a 3D animated preview in response to a determination that the vehicle is stopped, and displaying a still image in response to a determination that the vehicle is in motion.

FIG. 4 is a diagrammatic view of a vehicle speed detection process 90 by which interactive, on-vehicle 3D navigation system components 10 determine whether to display 3D animated preview 24 or a still image, such as isolated frame 24a. Vehicle speed detection process 90 begins with detecting operation 92, in which vehicle speed detector 34 determines vehicle speed. Vehicle speed detector 34 may determine vehicle speed through, for example, the vehicle's CAN bus or other form of networked communication with the vehicle's electrical systems. Vehicle speed detector 34 may communicate the vehicle speed to display 32. Vehicle speed detection process 90 may then proceed to determining operation 94, in which display 32 determines whether the vehicle is stopped. If the vehicle is stopped, vehicle speed detection process 90 proceeds to displaying operation 96, in which 3D animated preview 24 is displayed.

If the vehicle is in motion, vehicle speed detection process 90 proceeds to displaying operation 98, in which still frame 24a is displayed. Still frame 24a shows realistic, 3D imagery and instructional arrow 80, but remains as a still image rather than an animation. In illustrative embodiments, still frame 24a previews a location 8a (shown in FIG. 1) where a vehicle will enter a maneuver.

The on-vehicle interactive, 3D navigation system components 10 may show 3D animated preview 24 only when the vehicle has been stopped for a predetermined amount of time, such as two or three seconds. Alternatively display may use predetermined speed thresholds, and may display 3D animated preview 24 so long as the vehicle is travelling below a predetermined speed threshold. Still alternatively, a user may be allowed to override vehicle speed detection process 90 such that display 32 always shows 3D animated preview 24 regardless of vehicle speed, though in some implementations such override mechanisms may not be provided due to safety considerations.

With this understanding of one example of an interactive, 3D navigation system with turn animated preview functionality in mind, it should be understood that this functionality is augmented in accordance with the presently disclosed innovation by also providing the ability to view the surrounding at a specified destination following or as part of navigating to that destination. It should be understood that, without a familiarity with the area surrounding the specified destination, it is conventionally difficult to navigate the proximity surrounding the specified destination.

Conventional navigation systems enable viewers to visualize a specified destination in advance of arriving at the destination. However, conventional navigation systems fail to provide details regarding the surroundings or vicinity surrounding the specified destination. Thus, the destination view may be provided from an elevated perspective so as to provide a view with details regarding the surroundings located at or near the specified designation.

Although conventional maps may be either in a flat, two-dimensional configuration or a three-dimensional configuration, neither type of conventional maps effectively match what a viewer would see in reality at a specified destination. For example, GOOGLE EARTH™ has been conventionally integrated in some cars such that drivers have realistic imagery of the destination which helps understanding the area. As a result, it is conventionally possible for a viewer to pan around a specified destination; however, such panning is cumbersome and unsafe for the driver while the vehicle is in motion, i.e., the driver is driving. Moreover, satellite imagery currently consists of only flat, dimensional images. As a result of these deficiencies, viewers are unable to readily understand details of the area surrounding a specified destination.

Disclosed embodiments remedy these deficiencies by providing data, information and a plurality of perspectives of the area surrounding a destination specified in a navigation system. Such a plurality of perspectives enable a user to take look ahead at an area around where they will be driving so as to better understand the vicinity of a destination as they would actually see it upon arrival.

Such a plurality of prospectives may be presented together in what may be termed a "helicopter view" of the specified destination; such a helicopter view may be presented in a three dimensional format, that is, providing the appearance of the three dimensional space surrounding the specified destination.

Figure 5:
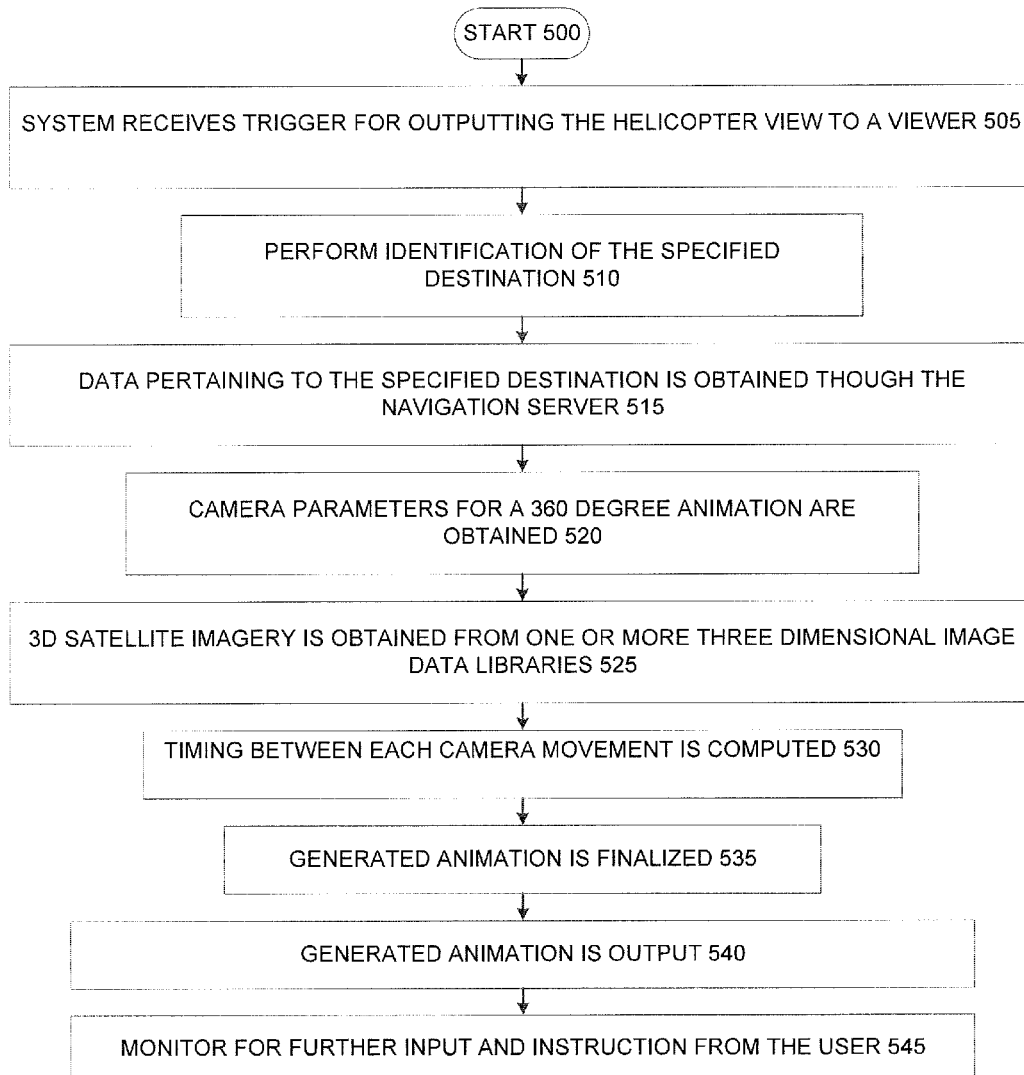
FIG. 5 is a flow diagram illustrating an exemplary usage of the interactive 3D navigation system in accordance with the present disclosure showing that a user may trigger display of a helicopter view of a destination specified in the navigation system.

Generation of the helicopter view may be performed as illustrated in FIG. 5. As shown in FIG. 5, the method begins at 500, and control may proceed to 505 at which the system may receive a trigger for outputting the helicopter view to a viewer. This trigger may be in form of a voice command or receipt of user input via various hardware devices, e.g., knobs/buttons, touch screen(s), and/or gesture recognition hardware/software included in or utilized by a user interface for the navigation system, as explained above in conjunction with the description of FIG. 2.

In response to the trigger, control may proceed to 510, at which identification of the specified destination is performed. Control then proceeds to 515, at which data pertaining to the specified destination is obtained though the navigation server, e.g., server 36 illustrated in FIG. 1.

Control then proceeds to 520, at which the camera parameters for a 360 degree animation are obtained. These camera parameters may include, for example, position, orientation and field of view.

Control then proceeds to 525, at which 3D satellite imagery is obtained from one or more three dimensional image data libraries. In an exemplary implementation, the 3D satellite imagery data may be provided, for example, by GOGGLE® EARTH®, from Google Inc. of Mountain View, Calif., with API 30a being a GOOGLE® EARTH® API. Control then proceeds to 530, at which the timing between each camera movement is computed so as to present a smooth animation to the viewer. Control then proceeds to 535, at which the generated animation is finalized.

Control then proceeds to 540, at which the generated animation is output to the viewer(s), e.g., displayed on a navigation screen. Control then proceeds to 545, at which the system monitors for further input and instruction from the user.

As a result, the disclosed embodiments have the ability to generate realistic imagery rendered in three dimensions for use in guiding and informing drivers/passengers of the details surrounding a vehicle.

Figure 6:
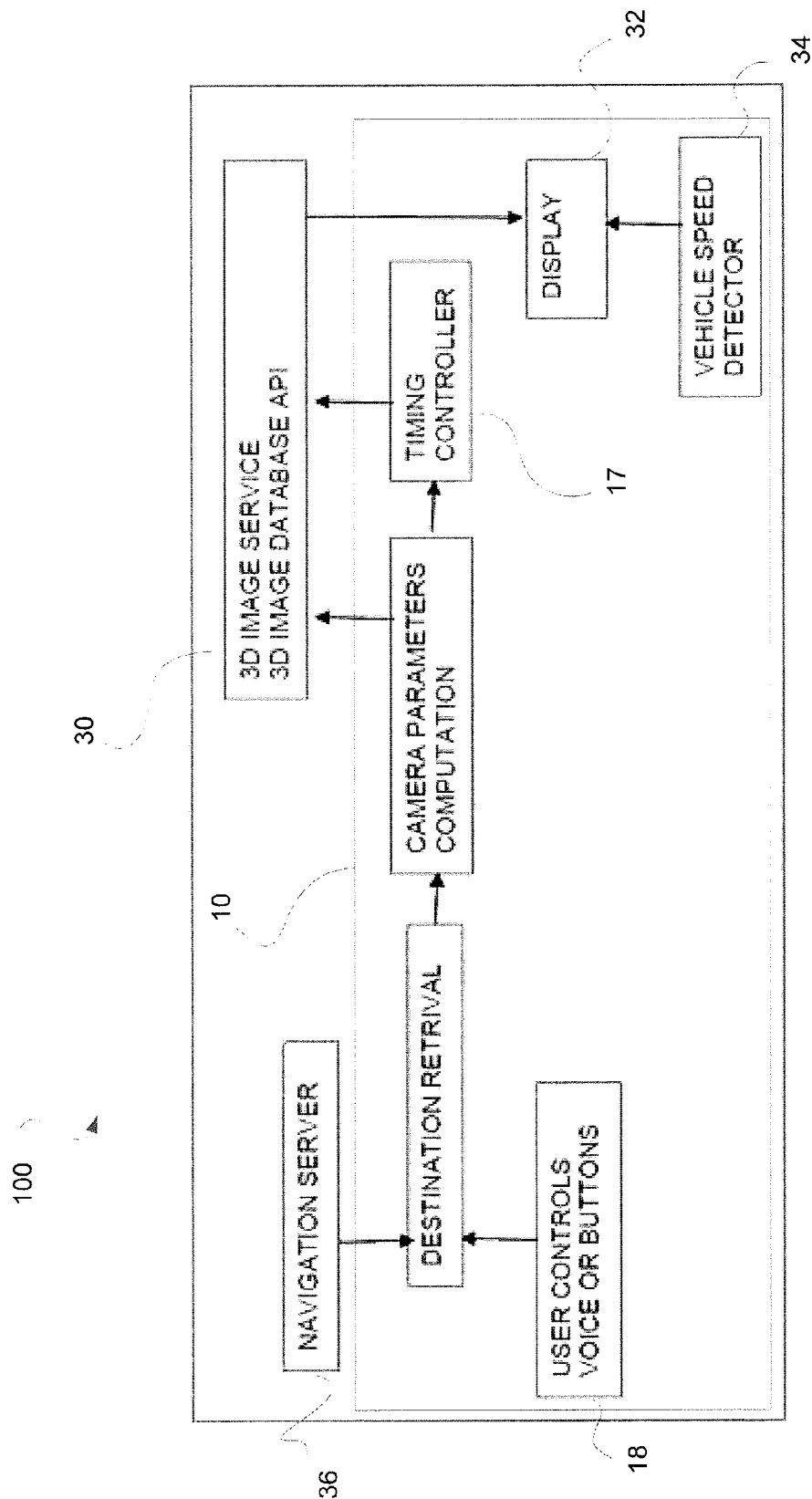
FIG. 6 illustrates those components of the navigation system 100 illustrated in FIG. 1 that are used to provide the functionality of the helicopter view.

FIG. 6 illustrates those components of the navigation system 100 illustrated in FIG. 1 that are used to provide the functionality of the helicopter view. In particular, the destination retrieval, camera parameter computation and timing control discussed in connection with FIG. 5 are performed by the components of the on-vehicle, interactive 3D navigation system components 10. As a result, the navigation server 36 provides data for destination retrieval along with the user controls provided by user control system 18. Further, the camera parameters computation and timing control provided use data received from a 3D image service via 3D image database API(s) as discussed herein. That data is also used to formulate the animation that is output to the display 32 of the on-vehicle, Interactive 3D navigation system components (which may be constrained by the monitoring of the vehicle speed detector 34, as explained herein).

It should be understood that, in accordance with disclosed embodiments, the helicopter view may be generated not only for a specified destination input to a navigation system; rather, in accordance with at least some embodiments, the helicopter view may be generated and triggered for any particular location along a user's path routed for navigation by the navigation system. Accordingly, controls may be implemented through various forms of user input, including voice control or touch/haptic control, interaction with a touch screen knobs, buttons or icons included in the navigation system, etc.

Figure 7:
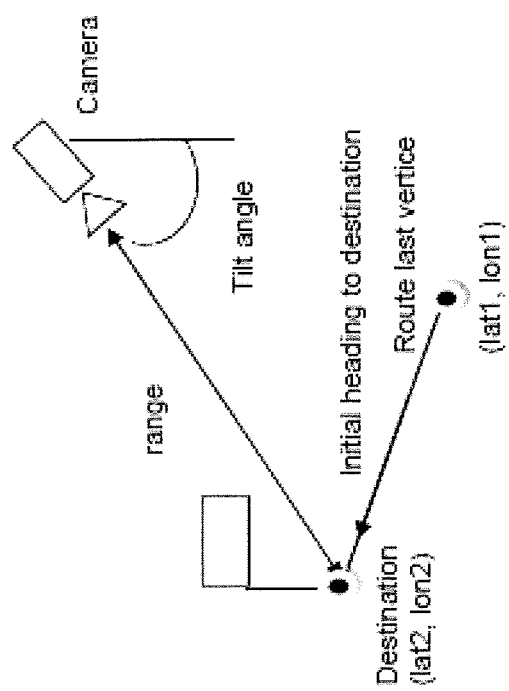
FIGS. 7 and FIG. 8 provide additional detail regarding the operations performed that enable operation of the timing controller and camera parameters computation.
Figure 8:
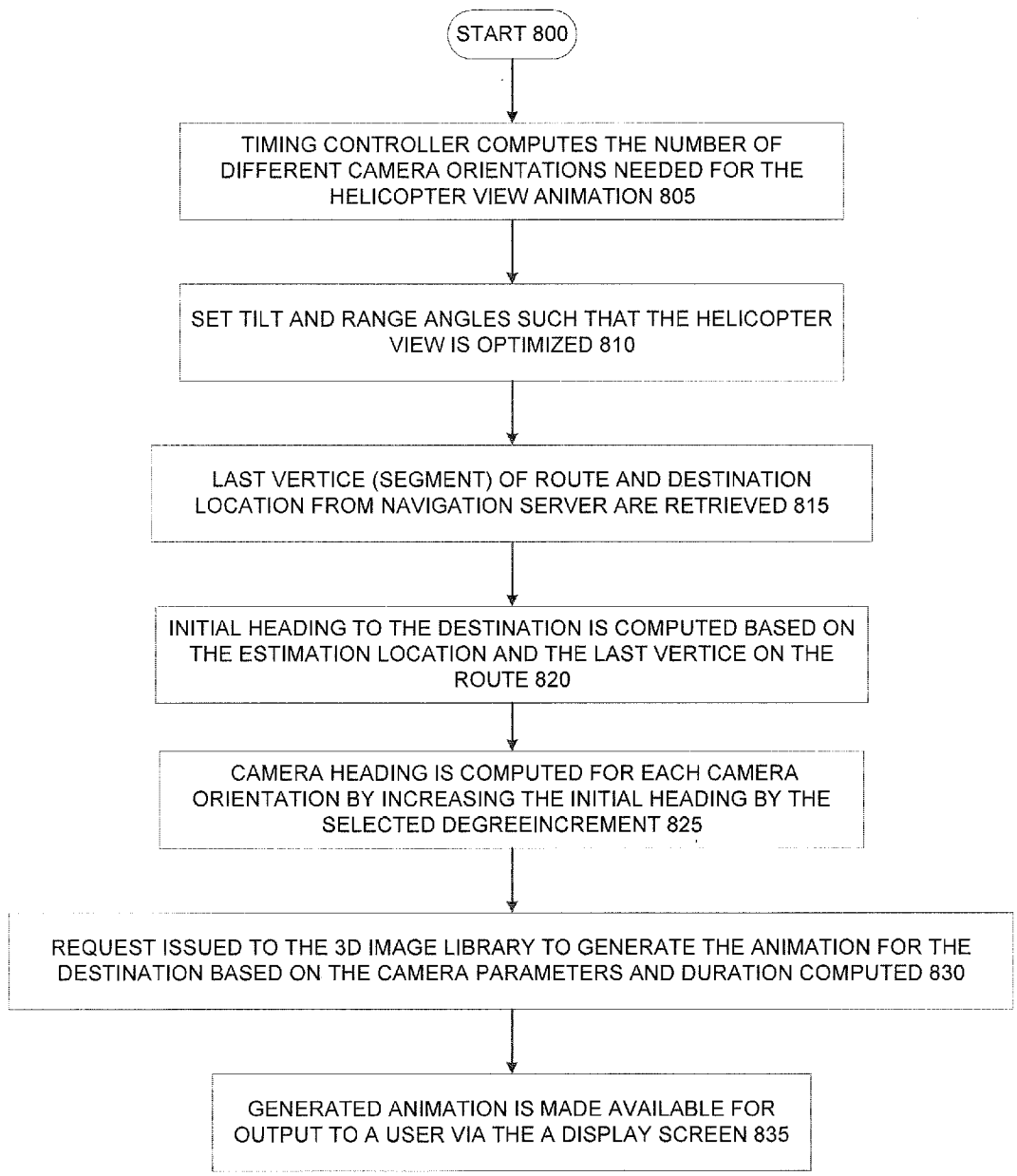

FIGS. 7 and FIG. 8 provide additional detail regarding the operations performed that enable operation of the timing controller 17 and camera parameters computation. As shown in FIG. 8, operations begin at 800 and control proceeds to 805, at which the timing controller computes the number of different camera orientations needed for the helicopter view animation. In order for the displayed image to accomplish a 360 rotation around the destination, numCamera=360/DegreeIncrement, wherein the DegreeIncrement corresponds to the number of degree/second between each camera movement. The larger this number is, the fastest the animation will be, e.g., each camera movement may be accomplished in 1 second.

Control then proceeds to 810, at which operations for calculating the control parameters are begun. More specifically, at 810, the tilt and range angles are set such that the helicopter view is optimized (e.g., not too close, not too far, and such that we see far away enough from the destination). Control then proceeds to 815, at which the last vertice (segment) of route and destination location from navigation server are retrieved. See, for example, FIG. 7. Control then proceeds to 820, at which the initial heading to the destination is computed based on the estimation location and the last vertice on the route. This may be performed using well known operations to perform a heading computation between two points, followed by calculation of the difference (Deltalon) between the longitude for location 2 (lon2 in FIG. 7) and longitude for location 1 (lon1 in FIG. 7) and calculations involving the latitudes for location 2 (lat2 in FIG. 9) and latitude of location 1 (lat1 in FIG. 7). Subsequently, the heading may be determined by applying the formula Heading=atan2(Y,X), where Y=sin(DeltaLon)*cos(lat2) and X=cos(lat1)*sin(lat2)−sin(lat1)*cos(lat2)*cos(deltaLon). These operations complete those necessary for the camera parameters computation.

Control then proceeds to 825, at which the camera heading is computed for each camera orientation by increasing the initial heading by the DegreeIncrement selected at 805. Control then proceeds to 830, at which a request is issued to the 3D image library to generate the animation for the destination based on the camera parameters and duration computed (duration, latitude destination, longitude destination, heading, tilt angle and range).

Control then proceeds to 835, at which the generated animation is available for output to a user via the display screen.

As a result, when the viewer(s) (e.g., driver and/or passenger) arrive at the specified destination, the user may be provided with such details so as to enable the viewer to find parking for the vehicle in which the navigation system is used, or to identify a safe/convenient location to allow a passenger to depart from the vehicle.

Figure 9:
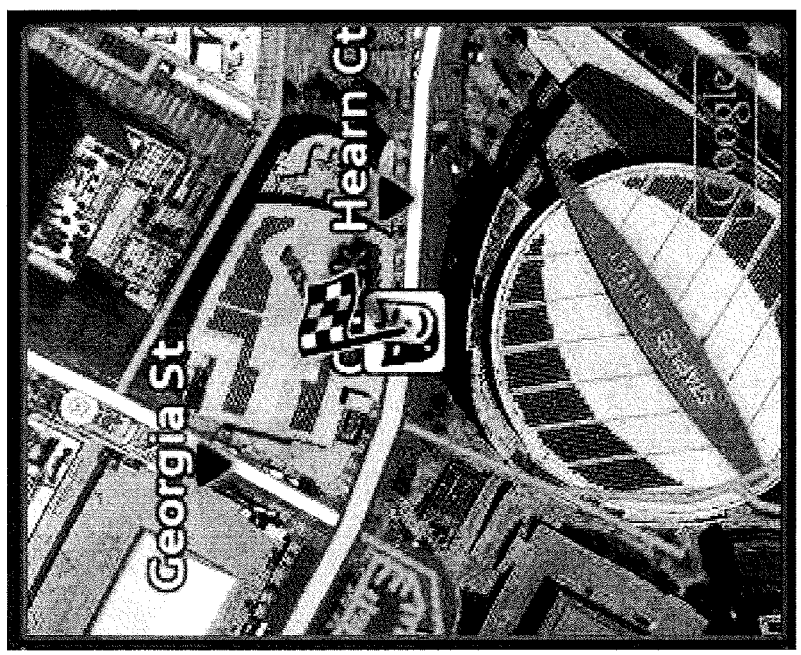
FIG. 9 illustrates an example of the type of destination view that is available in some convention systems.

Such details provide additional information beyond the type of destination view that is available in some convention systems, an example of which being illustrated in FIG. 9. In such conventional systems, drivers have realistic imagery of a destination, which aids understanding of the surround area. However, the data used to populate that imagery is limited to satellite imagery that are flat two dimensional (2D) images that do not necessarily enable understanding of the surrounding area.

To the contrary, disclosed embodiments provide the ability to provide a helicopter view of a destination in 3D. Accordingly, with the push of a button or a voice command, a user/driver can start an animation that shows a 360 degree view around a specified destination. The view is elevated (higher than the altitude of the surroundings to provide an improved understanding of the surrounding area for the destination.

Figure 10:
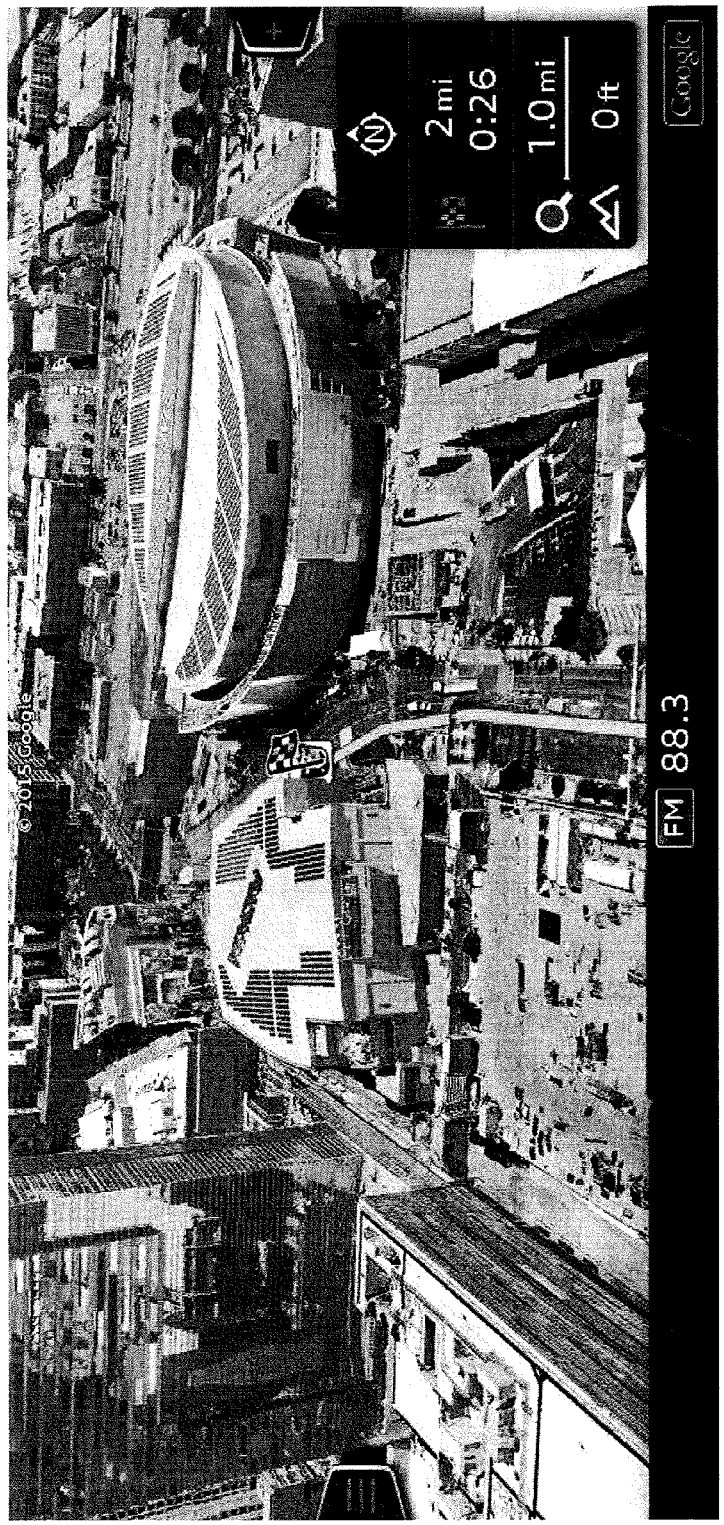
FIG. 10 illustrates a display of an animation from an elevated perspective that may be result from a user/driver pressing a button to activate the helicopter view, voice command etc.
Figure 11:
FIGS. 11-14 illustrate how, when implemented to provide an animation (a plurality of views) the resulting imagery may then be displayed so at to provide a rotation around the specified destination
Figure 12:
Figure 13:
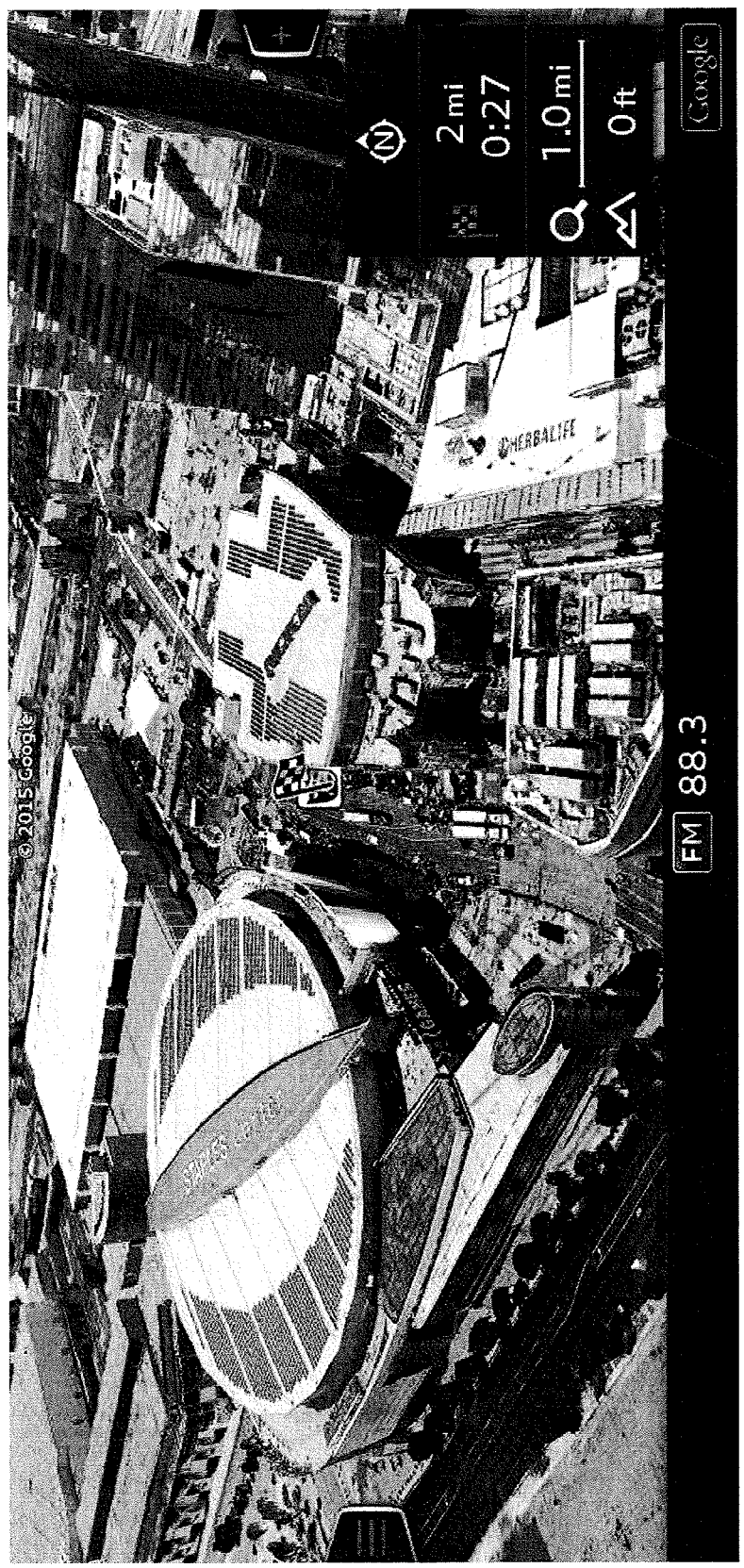
Figure 14:

Thus, as illustrated in FIG. 10a user may be provided with an elevated animation/view(s) that provides an improved understanding of surroundings of an area where a specified destination is located. In such an implementation, the view(s) may include an indication of the route specified by to arrive at the destination to further acclimate or orient the driver in the surroundings. Also included in the displayed animation/view(s) may be information including compass direction, scale, estimated time and distance to the specified location and grade to the specified location.

Triggering of display of the helicopter view may be performed in response to receipt of a user's instruction, e.g., performed via a push of a button by a user or voice command. As part of that display, an animation may be output to the user that shows a 360 degree view around the destination. That view may be elevated (higher altitude) a specified distance from the ground) to provide an improved understanding of the area. It should be understood that this specified distance may be a standard distance, e.g., 25 meters; alternatively, the distance may be selected from a number of options, e.g., 25 meters, 40 meters or 65 meters elevated above the ground. Thus, triggering of the display illustrated in FIG. 10 may be the result of a user/driver pressing a button to activate the helicopter view, voice command etc.

When implemented to provide an animation (a plurality of views) the resulting imagery may then be rotated around the specified destination, as illustrated in FIGS. 11-14.

The additional details resulting from the multiple and elevated views may also enable the viewer to identify a meeting point previously communicated between the viewer and a new passenger, e.g., "Meet me at Entrance 1 to the Colliseum on the West side."

Alternatively, the details may also enable the viewer to determine driving directions so as to enable the driver to drive a short distance, e.g., around the block, until a passenger has completed a quick task at the specified destination. This is particularly valuable if the specified destination is located in an area where there are a large number of one way streets that may make navigating to return to the specified destination more complex than where two-way direction traffic is permissible on all or almost all streets.

Further, the details may enable a viewer to identify a location near the specified destination where the viewer may wait in the car until the passenger has completed their task at the specified destination.

To avoid driver distraction, an animation may optionally only be played while the car is stopped. As explained above in relation to FIGS. 4 and 6, a vehicle speed detector may be used to enable or disable output of the helicopter view based on speed of the vehicle. Thus, as explained in connection with FIG. 4 above, a determination as to whether to display 3D animated data (this time associated with the surroundings of the specified destination) may be based on a vehicle speed detection process. Thus, the interactive, 3D navigation system 10 determines whether to display 3D animated data or a still image, such as an isolated frame depicting the destination surroundings. For example, the interactive, 3D navigation system 10 may show 3D animated, elevated view only when the vehicle has been stopped for a predetermined amount of time, such as two or three seconds.

Alternatively display may use predetermined speed thresholds, and may display 3D, animated elevated view so long as the vehicle is travelling below a predetermined speed threshold. Still alternatively, a user may be allowed to override vehicle speed detection process such that display always shows the 3D, animated, elevated view of the destination surroundings when triggered regardless of vehicle speed, though in some implementations such override mechanisms may not be provided due to safety considerations.

It should be understood that a rendering of an animated view may optionally enable a user to zoom in and zoom out of the rendered image and move through and still/pause an animation by input of user commands via touchscreen, voice, buttons, knobs or gesture recognition.

Interactive 3D navigation system components 10, including route selector 12, turn selector 14, location selector 15, vantage controller 16, timing controller 17, instructional overlay integrator 19, vehicle speed detector 34, and user control system 18, may be implemented in software, compiled and stored to a memory as object code, and during operation of the vehicle, may be invoked for execution by a processor. In one implementation, the above-described components are implemented as a single system on a chip. The interconnections among the above-described components can be provided through any suitable electronic communication mechanism, such as a communication bus. Whether implemented as one chip module or multiple chip modules, interactive 3D navigation system components 10 may be provided in any convenient location in the vehicle, such as behind a dashboard near other electronic circuitry. Such a location may be beneficial for providing convenient access to a power source, and to the electronic systems controlling the vehicle's driving.

Display 32 may be any display suitable for use in displaying information or entertainment features to a user, and may be part of an "infotainment" unit. Display 32 may include a touch screen interface through which a user can interact with graphical icons rendered on display 32 using gestures. 3D image service 30 and navigation server 36 may be implemented in any suitable server environment, and may include a processor, memory, and computer-readable code stored on the memory for execution on the processor. 3D image database 30b may be implemented using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A vehicle navigation system providing for navigational instructions as well as the ability to provide an elevated view of surroundings at a destination for a user, the system comprising:
  a processor and a non-transitory data storage on which is stored computer code which, when executed on the processor, causes the vehicle navigation system to:
  obtain a route between an origin and a destination, wherein the route includes instructions for navigation to the destination;
  determine if a vehicle being operated by the user is stopped;
    means for selecting vantages and timing for a three-dimensional animated preview of the destination specified in the navigation system and for retrieving the three-dimensional animated preview, wherein the three-dimensional animated preview illustrates an elevated view of surroundings at the destination; and
  a display for displaying the three-dimensional animated preview in response to a determination that the vehicle is stopped to the user.

2. The vehicle navigation system of claim 1, wherein the three-dimensional animated view provides a realistic view of the surroundings at the destination, including three-dimensional imagery of recognizable landmarks in the surroundings.

3. The vehicle navigation system of claim 1, wherein the point of view from which the three-dimensional animated preview is generated is selected so as to provide a vantage of the destination that avoids obstructions to the user's view.

4. The vehicle navigation system of claim 1, wherein the system further comprises at least one user control that enables a user to trigger display of the three-dimensional animated preview on the display.

5. The vehicle navigation system of claim 4, wherein the at least one user control is implemented using one of a steering wheel button, touch screen or voice control or haptic control functionality.

6. The vehicle navigation system of claim 1, wherein the means for selecting vantages and timing includes a timing controller that computes timing data to guide creation of three-dimensional animations using three-dimensional image data and computes timing data to determine relative speeds of different portions of the three-dimensional animated preview.

7. The vehicle navigation system of claim 6, wherein the means for selecting vantages and timing includes a vantage controller and the system queries a three-dimensional image service, wherein the query includes position, orientation, and field of view information computed by vantage controller, and timing data computed by timing controller.

8. The vehicle navigation system of claim 7, wherein the query is performed through an application protocol interface, which in turn queries and retrieves frames of image data from a three-dimensional image database.

9. The vehicle navigation system of claim 1, wherein the means for selecting vantages and timing are configured to select vantages that avoid obstructions.

10. The vehicle navigation system of claim 1, further comprising user controls that enable the user to adjust the vantages.

11. A method for providing navigational instructions as well as the ability to provide an elevated view of surroundings at a destination for a user, the method comprising:
obtaining a route between an origin and a destination, wherein the route includes instructions for navigation to the destination;
determining whether a vehicle being operated by the user is stopped;
selecting vantages and timing for a three-dimensional animated preview of the destination specified in the navigation system and for retrieving the three-dimensional animated preview, wherein the three-dimensional animated preview illustrates an elevated view of surroundings at the destination;
accessing the three-dimensional animated preview; and
displaying the three-dimensional animated preview to the user on a display in response to a determination that the vehicle is stopped.

12. The method of claim 11, wherein the three-dimensional animated view provides a realistic view of the surroundings at the destination, including three-dimensional imagery of recognizable landmarks in the surroundings.

13. The method of claim 11, wherein the point of view from which the three-dimensional animated preview is generated is selected so as to provide a vantage of the destination that avoids obstructions to the user's view.

14. The method of claim 11, further comprising receiving a user input via at least one user control that enables a user to trigger display of the three-dimensional animated preview on the display.

15. The method of claim 14, wherein the at least one user control is implemented using one of a steering wheel button, touch screen or voice control or haptic control functionality.

16. The method of claim 11, wherein the timing is selected by a timing controller that computes timing data to guide creation of three-dimensional animations using three-dimensional image data and computes timing data to determine relative speeds of different portions of the three-dimensional animated preview.

17. The method of claim 16, wherein the vantages are selected by a vantage controller and the method further comprises querying a three-dimensional image service, wherein the query includes position, orientation, and field of view information computed by vantage controller, and timing data computed by timing controller.

18. The method of claim 17, wherein the query is performed through an application protocol interface, which in turn queries and retrieves frames of image data from a three-dimensional image database.

19. The method of claim 11, wherein vantage and timing selection selects vantages that avoid obstructions.

20. The method of claim 11, further comprising receiving user input via at least one user control that adjust the vantages.

* * * * *